(12) United States Patent
Farnia

(10) Patent No.: US 7,567,010 B1
(45) Date of Patent: Jul. 28, 2009

(54) MODULAR ELECTRIC MOTOR WITH STACKABLE STATOR POLES

(75) Inventor: David Farnia, Elburn, IL (US)

(73) Assignee: Burgess-Norton Mfg. Co., Inc, Geneva, IL (US)

( * ) Notice: Subject to any disclaimer, the term of this patent is extended or adjusted under 35 U.S.C. 154(b) by 0 days.

(21) Appl. No.: 12/082,176

(22) Filed: Apr. 10, 2008

(51) Int. Cl.
*H02K 1/18* (2006.01)

(52) U.S. Cl. .................... 310/218; 310/44; 310/216

(58) Field of Classification Search ................ 310/218, 310/216, 44
See application file for complete search history.

(56) References Cited

U.S. PATENT DOCUMENTS

| | | | | |
|---|---|---|---|---|
| 6,300,702 B1 * | 10/2001 | Jack et al. | ................. | 310/216 |
| 6,441,530 B1 * | 8/2002 | Petersen | ................. | 310/216 |
| 6,583,530 B2 * | 6/2003 | Hsu | ................. | 310/254 |
| 6,956,307 B2 * | 10/2005 | Engquist et al. | ................. | 310/44 |
| 7,067,948 B2 * | 6/2006 | Yamaguchi et al. | .... | 310/156.47 |
| 7,342,338 B2 * | 3/2008 | Miyazaki et al. | ....... | 310/156.47 |
| 7,408,282 B2 * | 8/2008 | Stewart | ................. | 310/218 |
| 2006/0071574 A1 * | 4/2006 | Stewart | ................. | 310/218 |
| 2007/0252471 A1 * | 11/2007 | Holmes et al. | ............. | 310/218 |

* cited by examiner

*Primary Examiner*—Hae Moon Hyeon
(74) *Attorney, Agent, or Firm*—Edward J. Brosius

(57) ABSTRACT

A modular electric motor stator pole comprising a plurality of independent stator components stacked axially, each stator segment comprising a tooth tip, a back iron and a coil, the tooth tip comprising a stator face and a tooth body, the tooth body having a first end on the tooth tip, a winding support and a second end. The coil having a plurality of windings about an open core, the winding support extending through the open core. The back iron removably attached to the second end of the tooth body and adjacent stator segments are spaced by interfaced adjacent back iron. The modular stator pole assembled with a predetermined number of stator components wherein the design may be changed without retooling the manufacturing facility by adding or subtracting independent stator components from the stack and further the modular design allows replacement or assembly of components in the field.

8 Claims, 3 Drawing Sheets

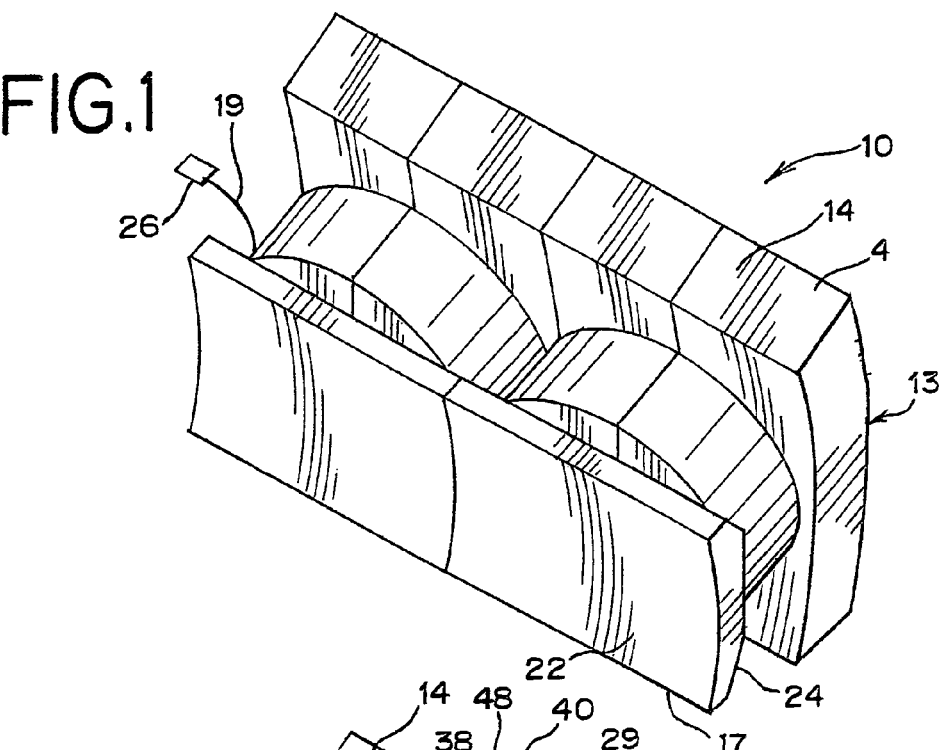
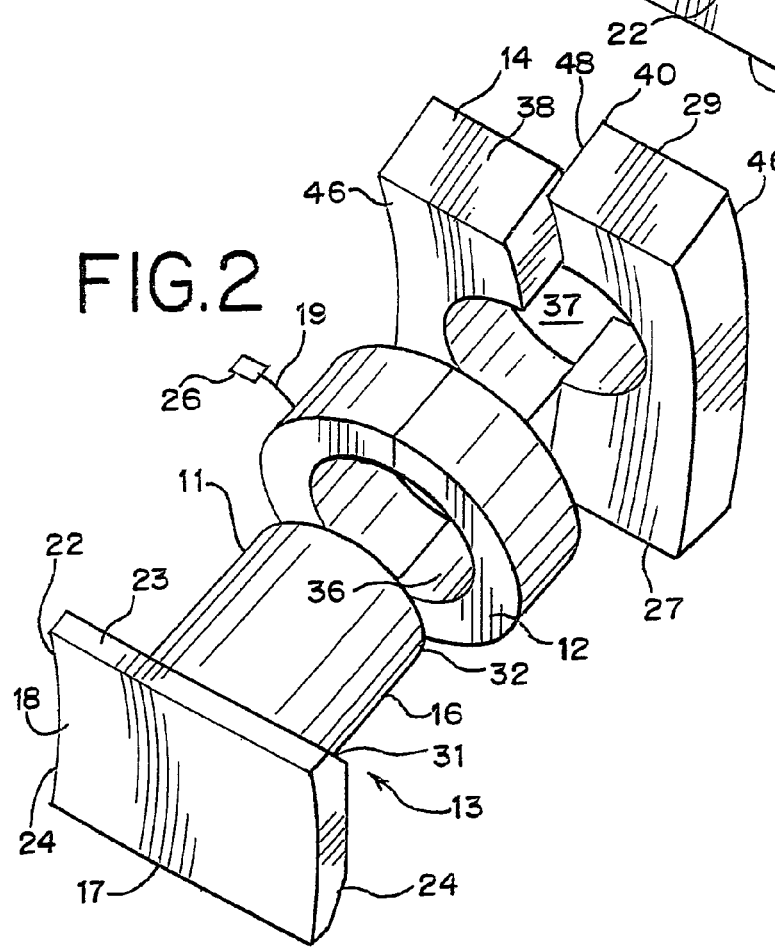

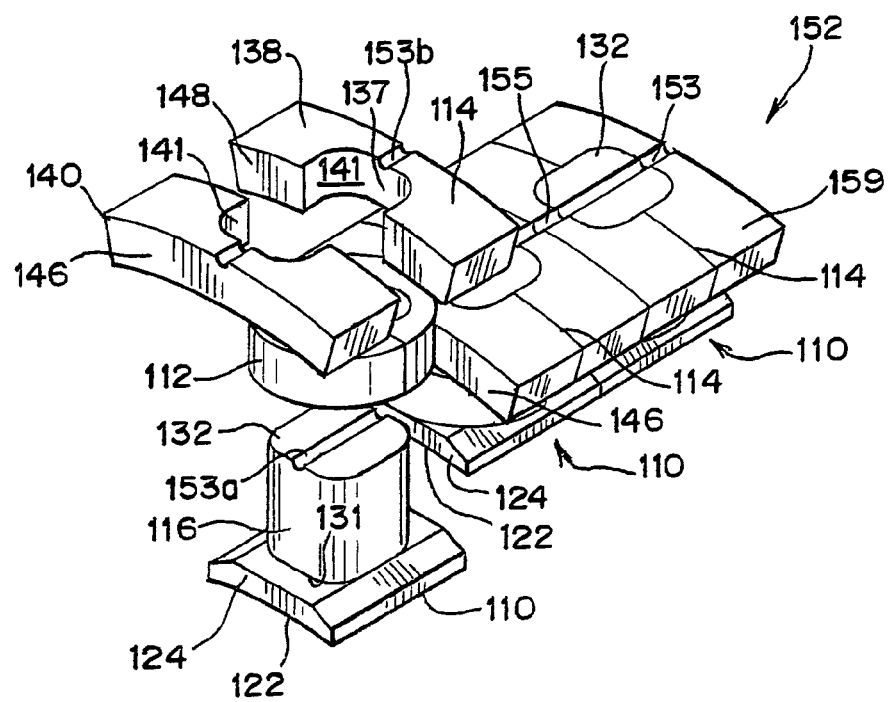
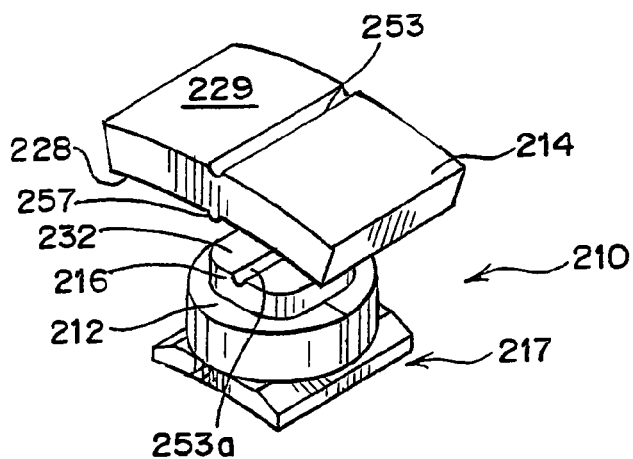
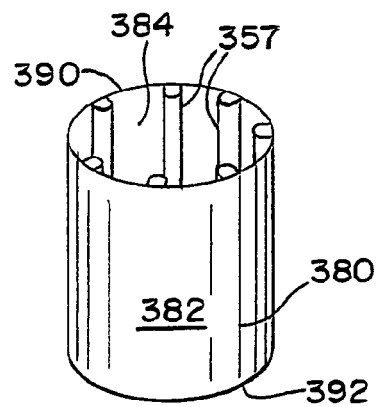

MODULAR ELECTRIC MOTOR WITH STACKABLE STATOR POLES

BACKGROUND OF THE INVENTION

The present invention relates to electrical machines and more particularly a design and method of manufacture for electric motors specifically a stator pole assembly.

Electric motors and generators have a stationary element, termed a stator and movable or rotating elements termed a rotor. The interaction between the stator and the rotor is caused by the interaction on a magnetic field generated by either the stator or the rotor. Such magnetic field is usually generated or induced by electric currents in a winding on either the stator or the rotor or both. Such winding usually comprises a plurality of coils wound around a winding support. The winding support is usually comprised of a soft magnetic material which traditionally is made of laminations of selected steel materials. The laminations are insulated from each other in order to reduce eddy currents. The rotational forces on the rotor about the axis of the rotor are a function of the interaction of the stator and rotor magnetic fields. The forces are generated at a radial distance from the axis generating torque on the rotor resulting from the force of the interaction and the moment arm of the rotor. The moment arm is calculated by the redial displacement of the magnetic field of the rotor with respect to the axis of the rotor.

One concern in the design of such electrical motors is the need or desire to reduce the free space by improving to fill factor of the segments. It is desirable that the segments fill as much of the open space is practical to improve the interaction between the electromagnetic field between the stator in the rotor this produces a more efficient motor generator. Such terminology is deemed as the power density of the motor.

It's become known to replace laminated steel materials of the stator or rotor cores with ferro magnetic powder particles. These ferro magnetic particles are compacted in a powder metallurgy operation to form the winding support. The ferro magnetic power particles themselves are electrically insulated from each other so the resulting compacted product exhibits a low eddy current loss in a manner similar to the use of stacks of laminated steel materials. Such use of compacted metal particles comprised of ferro magnetic powder particles for cores electrical machines is disclosed in U.S. Pat. Nos. 6,956,307 B2, 6,300,702 B1 and 6,441,530 B1.

Prior art motor designs use a significant amount of air space and can be large and heavy when assembled making shipping the assembled electric motor costly. When installing or maintaining, prior art motors require special handling due to the size and weight. Furthermore, prior art motors are not designed to be modular and capable of being broken down to separately shipped components. Design changes to the motor also often require motor manufacturers to retool a facility to manufacture a different design. Retooling is generally very expensive and requires down time from production while the tooling is modified or replaced.

Conventional prior art motors use large amounts of copper in the windings to form each pole of the stator. The magnetic field generated is related to the amount and placement of the copper as well as the current in the windings. Power density may be increased by increasing the effective use of the copper and maximizing the inner surface area of the stator. Increasing the power density of the motor may also be accomplished by forming a modular shaped segment from the ferro magnetic particles to conform the electric motor to the space available.

Prior art motors also require the removal and complete disassembly in order to maintain or repair the stator. There is a need for a modular motor design that may be shipped in segments to an installation site wherein each segment can be optimized to generate a magnetic field of predetermined strength by design of the stator face to optimize available mounting space and optimal use of copper windings to conduct current through the stator segment to create such magnetic field and furthermore, allow alternative designs by stacking a predetermined number of segments to form a stator of a predetermined length to generate performance characteristics engineered for a particular application without retooling the motor manufacturing facility.

SUMMARY OF THE INVENTION

The present invention provides an improved stator assembly for an electrical machine and, more specifically and improved stator assembly for use in electrical motor or generator applications depending on the configuration. The improved stator assembly comprises a plurality of components formed into discrete stator poles. And a plurality of stator poles assembled together to form a complete stator assembly. The number of poles is determined by the characteristics of the motor desired. Each pole has a predetermined number of components stacked from a first end of the stator to the second end. The number of components in each pole is calculated by the characteristics of the desired electrical machine. The stator assembly is understood to be generally cylindrical in structure.

Each stator assembly component in a resulting electric motor comprises a winding for connection to an electrical source to generate an electrical field and a tooth for guiding and shaping the electrical field for interaction with a movable rotor portion. The tooth comprises a back iron, body in the face. The winding is created either by winding directly onto the tooth body, or by prewinding onto a bobbin and inserting the tooth into the bobbin, or by winding around a mandrel and inserting the wound coil over the tooth.

Each stator component may be shipped as individual components for assembly in the field by a machine assembly team. Furthermore, in the event of a component failure, a modular piece of the electrical machine may be shipped for replacement without replacing the entire motor. Most motor failures occur in the bearings or the windings. It's a feature of the present invention that such an improved stator assembly comprises a modular assembly of stator components for replacement of the winding for easy maintenance.

A means for assembling a modular stator assembly is described having means for creating a magnetic field held in place on winding support means. Positioning means holds the means for creating the magnetic field in spaced relation to adjacent magnetic field means in the same stator pole assembly and in adjacent stator poles. A means for energizing the filed means is connected by connection means to the filed means. The support means are held in aligned relation by a means for alignment on the outside of the support means. A means for enclosing is used as a securing means to hold the plurality of field means in spaced relation and the plurality of stator poles is their respective angular position around the axis of the stator. A means for adding an additional stator component to stator pole or replacing a failed stator component or component part is provided by removably assembling the components into a stator pole wherein the assembly can be disassembled, the component replaced and the assembly reassembled.

A method of assembling a modular stator comprising forming plurality of stator components, each stator component having a tooth formed of ferrous magnetic metal powder particles having individual particles individually insulated; forming a coil comprising a predetermined number of turns of wire about a mandrel, the coil having a center opening; disposing the coil on the tooth by extending the tooth through the center opening; securing the coil between a stator face on the tooth and a back iron on the tooth; stacking a first plurality of stator components to form a first stator pole while holding the coils in spaced relation; assembling a second stator pole by stacking a second plurality of stator components while holding the coils in spaced relation; assembling the first stator pole and second stator pole each at a respective angular position about a stator axis to form a multi-pole stator having the adjacent coils of the first and second stator pole held in spaced relation; securing the stator poles in position by surrounding the stator with a housing.

A stator pole system comprising of a modular assembly of stator components stacked in groups forming a plurality of stator poles. Each stator pole having a plurality of stator components, each comprising an independent field generating system comprising a coil and a tooth. The coil for generating the magnetic field when connected to an electrical power supply and the tooth for holding the coil in a predetermined position with respect to an axis of the stator and in spaced relation to adjacent coils. The tooth formed of ferrous magnetic metal powder particles for supporting the coil. The stator pole system allowing replacement of individual stator components or individual coils in the field generating systems along the individual stator poles.

BRIEF DESCRIPTION OF THE DRAWINGS

FIG. 1 is a perspective view of an individual pair of stator components assembled with a winding on each stator component.

FIG. 2 is an exploded perspective view of a single tooth illustrating the components individually.

FIG. 6, is a perspective partially exploded view of a stator pole portion comprised of a stack of components of the second embodiment of the present invention.

FIG. 7, is a perspective view of a third embodiment of the present invention.

FIG. 8 is a perspective view of a motor housing.

DESCRIPTION OF THE PREFERRED EMBODIMENT

Figure 3:
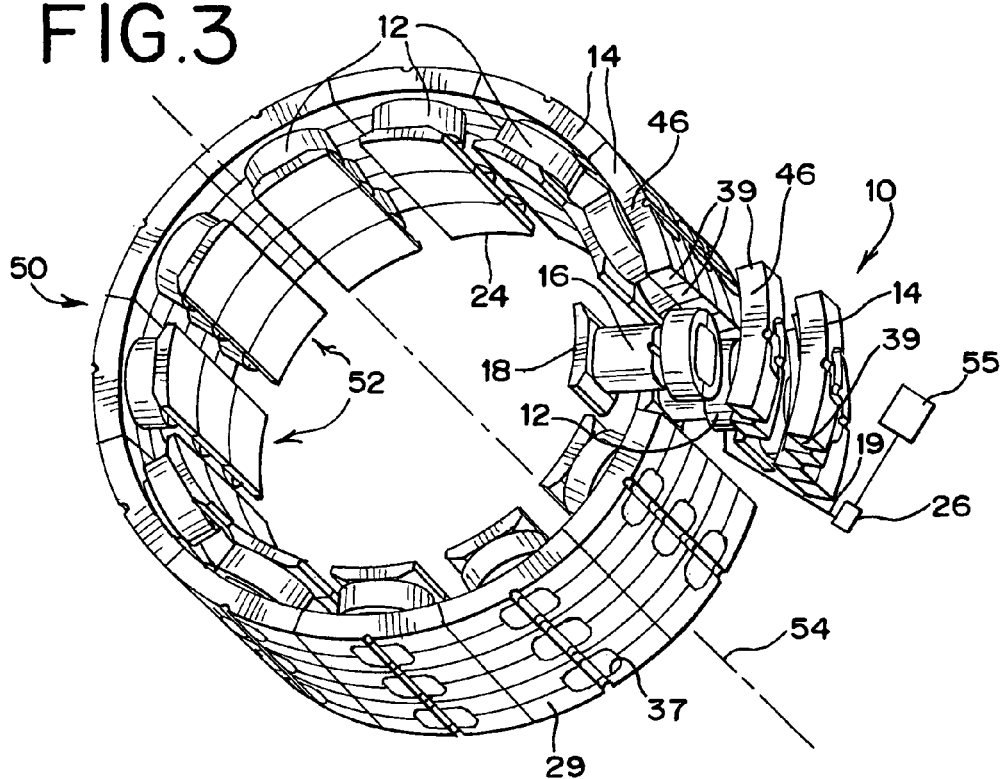
FIG. 3 is a modular section of an assembled stator of a 12 pole electric motor.

Referring to FIG. 1, the stator component 10 is a sub assembly comprising a coil 12 and a tooth assembly 13. The tooth assembly 13 comprises a back iron 14, tooth body 16 (FIG. 2) and tooth tip 17. The tooth tip 17 comprise a stator face 18 having a generally rectangular shape, an arcuate inner surface 22 closest to the rotor, a generally flat outer surface 23 on the tooth body and a pair of substantially similar axial ends 24. The arcuate inner surface 22 is concave along the axis of electric motor to provide a consistent air gap to a rotating rotor (not shown) rotating about the axis 54 (FIG. 3) of the motor. The air gap spaces the arcuate inner surface 22 from the rotor to provide a constant interaction of the rotor to the magnetic field of the stator pole 52 (FIG. 3). The tooth tip 17 is formed with soft magnetic composites (SMC) comprising ferrous magnetic metal powder particles. These particles are processed to generally be mutually insulated. The ferrous magnetic metal powder particles are pressure formed into the particular desired shape for the tooth tip 17 in a powder metal operation by die compacting and heat treating.

Continuing to refer to FIG. 1, the tooth tip 17 as a generally similar cross-sectional dimension across its axial length. The coil 12 comprises a plurality of windings of a conductive material preferably copper or aluminum wire 19. The wire 19 is insulated along its length to prevent short circuit connections between the windings.

Referring to FIG. 2, the coil 12 may be toroidal or rectangular in shape and is held in place on the tooth 11 by the tooth body 16 inserted into and extending through the open core 36 of coil 12. The tooth body 16 extends from the back iron 14 to the stator face 18 with the coil held therebetween. The coil 12 may be wound directly on the tooth 11 or may be formed separately on a bobbin or wound on a removable mandrel. The coil 12 having the open core 36 is assembled onto the tooth 11 as a separate part of the stator component 10 by slideably inserting the tooth body 16 therethrough. The coil 12 may have a number of windings using a conductive wire 19, such as copper or aluminum, having a particular current carrying capacity designed for the predefined application. For example a coil 12 may have five hundred (500) turns (wraps) of a number 18 copper wire 19. The coil 12 is connected using connector 26 to an electrical power supply to be energized with an electrical current to create a magnetic field in the stator, as is well known in the art of electric motors. The connectors 26 may be connected in parallel, series or individually controlled. Individually controlled components 10 may have a switch for engaging or disengaging one or more segments to change the performance characteristics of the motor.

Continuing to refer to FIG. 2, back iron 14 comprises two, mirror image components adapted for easy assembly on the tooth 11 and positioning adjacent the coil 12. The back iron 14 has an inner surface 27 and an outer surface 29 and is split into a first piece 38 and a second piece 40 to form a two piece assembly on the tooth 11. The back iron 14 may alternatively comprise a single component having a tooth pocket formed as a tooth hole 37 or blind hole to secure the tooth 11, depending on the particular application. The back iron 14 is formed of ferrous magnetic metal powder particles which are individually insulated and formed to create a flux conductive channel to guide the flux created by the magnetic field of the coil 12. The use of insulated ferrous magnetic metal powder particles provides magnetic field support in a configurable form for conducting the magnetic field without short-circuiting between individual metal powder particles.

Referring to FIG. 2, the individual stator component 10 is shown in an exploded view to illustrate the tooth body 16 having a first end 31 attached to the outside surface 23 of the tooth tip 17 and a second end 32 spaced from the tooth tip 17 for extending through the open core 36 of the coil 12 and engaging the back iron 14. The tooth body 16 may vary in length or radial dimension perpendicular to the tooth tip 17 depending on the size of the coil 12 to be used. This configurable radial dimension allows the coil 12 to be formed based on design specifications for a particular size wire wound in the coil and a particular number of windings to create a predetermined magnetic force based on the electric current applied to the coil 12. Each winding in the modular design features current carrying wire formed around the tooth 11 having wire oriented axially and tangentially along the stator assembly 50 (FIG. 3). This modular design allows the wire 19 to optimize the strength of the magnetic field by the entire mass of the wire being in the stator pole assembly 50 (FIG. 3) as opposed to prior art designs wherein the wire is axially wound along the stator pole and only tangentially engaged at the ends of the stator pole 52 (FIG. 3).

Continuing to refer to FIG. 2, the back iron 14 is formed as two mirror image components 38, 40. These two components each have a concave outer surface 29, an inner surface 27 adapted to bear against the coil 12, an axial face 46 and a tooth tip face 48. The tooth tip face 48 has material removed therein to form the tooth hole 37 to engage and bear against the tooth body 16 to secure the back iron to the tooth body and hold the coil 12 against the stator face. The axial face 46 is adapted to bear against the back iron component of adjacent stator components and space adjacent stator components 10 at a predetermined distance. Stacked stator components 10 are held in spaced relation to position the respective coils 12 in place along the stack and spaced a predetermined distance from coils 12 of adjacent components 10 to form the stator assembly 50. The tooth tip face 48 is adapted to surroundingly engage the tooth second end 32.

Continuing to refer to FIG. 2, the tooth 11 and tooth tip 17 are formed of ferrous magnetic metal powder particles which are processed to be generally mutually insulated from the other particles. The particles are pressure formed into a desired, predetermined shape. As shown, the back iron 14 has material removed to form the tooth hole 37 in the mating tooth tip faces 48 for surrounding and engaging the tooth tip 17 for holding the coil 12 in place and conducting the magnetic field. In this way, the tooth 11 acts as a winding support as well as a flux conductor or flux guide to shape and support a magnetic field generated by a current in the coil 12.

Referring to FIG. 3, a portion of a twelve pole stator assembly 50 is illustrated comprising a plurality of stator components 10 assembled together. A portion of the stator assembly 50 shown is three stator components 10 in axial length. Each stator pole 52 is equally radially spaced from the axis 54 to interact with the coils 12 and support a magnetic field along the stator pole 52. Each stator component 10 is axially joined to adjacent components 10 and held in place by fasteners, a bonding agent such as adhesives (not shown) or by placement in a housing 380 (FIG. 8) to form a stator pole 52.

Continuing to refer to FIG. 3, the back iron 14 has a pair of opposing circumferential faces 39 for bearing against the circumferential faces 39 of adjacent stator components 10 in adjacent stator poles 52. The circumferential end faces 39 bears against stator components in adjacent stator poles 52 to hold the coil 12 in spaced relation to the coils 12 in the adjacent stator components 10 in adjacent stator poles 52. The axial face 46 bears against adjacent stator components in the stator pole 52 stack to hold the coil 12 in spaced relation to the coils 12 stacked in the stator pole 52.

As discussed with respect to FIGS. 1 and 2, each stator component 10 consists of a sub-assembly of a coil 12 on a tooth 11. The resulting electric motor or generator is scalable by the number of axially stacked components 10 assembled to form motor stator pole 52. The stator assembly 50 is easily constructed and maintained by the use of individual components 10. The stator components 10 are axially assembled to define the individual poles. This modular approach allows an individual component to be used in several different configurations to vary the performance characteristics of the electric motor. The wires 19 from each coil 12 connect to power supply 55. Power supply 55 conducts current into wires 19 forming magnetic field in coil 12 which is supported and conducted by tooth 13.

Figure 4:
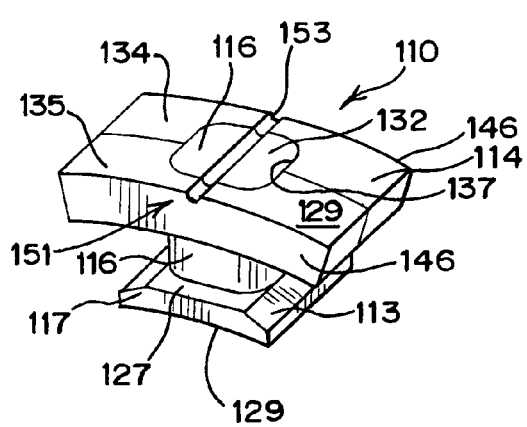
FIG. 4, is a perspective view of a second embodiment of the present invention.

Referring to FIG. 4, an alternative embodiment of the present invention is shown as a modular stator component 110 comprising a tooth 113 having a back iron 114, a tooth body 116 and a tooth tip 117. The back iron 114 has a first piece 134 and a second piece 135 attached to the tooth body 116 at the second end 132. The back iron 114 is attached using adhesives (not shown) or may be secured in place in a motor housing (not shown).

Continuing to refer to FIG. 4, the stator pole component 110 has an alignment tool 151 illustrated as a rib channel 153. The rib channel 153 is formed by removing material from the concave rotor face 129 of the back iron and the second end 132 of the tooth body 116. The rib channel 153 forms a continuous channel 153 between the opposed axial faces 146 of the back iron 114. The rib channel 153 receives a rib in the housing (FIG. 8) to align the tooth 113 to the back iron 116. The second end 132 of the tooth body 116 may be formed in a round or non-circular shape to attach to and align to the similarly shaped tooth hole 137 in the back iron 114. The tooth tip 117 also has concave rotor face 129 and generally flat outside surface 127 on tooth body 116.

Figure 5:
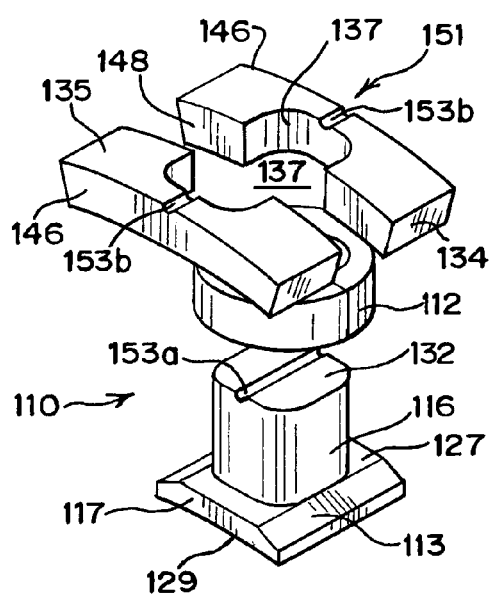
FIG. 5, is a perspective exploded view of the second embodiment of the present invention with a winding.

Referring to FIG. 5, an exploded stator pole component 110 is shown having the tooth body 116 attached to the tooth tip 117 preferably by forming the two portions as a single molded component made from the SMC as described above. The tooth portion of the rib channel 153a is formed in the second end 132 of the tooth body 116. The coil 112 fits around and is supported by the tooth body 116 and held in place by the back iron 114 comprising mirror image portions 134, 135 engaging the tooth body 116 at opening 137. The back iron portion of the rib channel 153b is formed axially aligned in each of the back iron pieces 134, 135 to line up with the tooth portion and form a continuous rib channel 153 running axially along the stator pole stack of stator components 110 forming the stator pole 152 FIGS. 3 and 6. It should be understood the coil 112 should be formed having an open core 157 dimensioned to tightly receive the tooth body 116.

Referring to FIG. 6, a stack of stator components 110 are assembled together to form a portion of stator pole 152. Each component 110 has a separate coil 112 supported on the tooth body 116 intermediate the tooth tip 117 and the back iron 114. The rib channel 153 on each component 110 lines up axially with rib channels 153 on adjacent components 110 to form a single rib groove 155 axially disposed along the stator pole 152. The axial ends 124 of adjacent tooth tips 117 abut against each other to form a smooth concave rotor face 122 for conducting the flux from the coil 112 to engage and interact with the rotor (not shown). The axial faces 146 of adjacent back iron 114 components abut against each other to form the continuous back iron structure and the continuous pole rib groove 155 along the outside surface 159 of the stator pole assembly 152.

Continuing to refer to FIG. 6, each back iron component 138, 140 has a tooth face 141 formed along tooth tip face 148 at tooth pocket 137 for surroundingly engaging second end 132 spaced from first end 131 of tooth body 116. Tooth face 141 is formed by removing material from segments 138, 140 to form a predetermined shape for receiving second end 132.

Referring to FIG. 7, a third embodiment of the present invention shows a stator component 210 comprising a tooth tip 217, tooth body 216 and single piece back iron 214. The tooth body 216 has a first end 212 on the tooth tip 217 and second end 232 spaced from the first end 231. Back iron 214 comprise a back iron rib channel 253 on the outer surface 229 for engaging a rib 357 on the housing or motor structure (FIG. 8). The inner surface 228 of back iron 214 has a tooth rib 257.

A tooth rib channel 253a is formed on the second end 232 to matingly engage the tooth rib 257 to align the tooth body 216 to the back iron 214.

Referring to FIG. 8, a motor housing 380 comprises a outside surface 382, inside surface 384, and opposing axial ends 390. A plurality of alignment ribs 357 are disposed at the pole positions around the inside surface 382. Each stator pole 152 (FIG. 6) has a rib channel 153 disposed in the outer surface 159 adapted and positioned to engage a corresponding alignment rib 357 to align and secure the stator pole segments 10 in stacked position axially aligned to form a stator pole 152 (FIG. 6). As discussed above, adhesive may further be used to hold the stacked stator components 10 in place during assembly.

In use the stator component 10 is assembled with the coil 12 held on the tooth body 16 between the back iron 14 and the tooth tip 17. Each coil 12 has a connector 26 extending from the winding 19 to connect to a current source for providing a magnetic field at the stator component 10. A motor having a pre-engineered performance characteristic is designed having a predetermined number of poles 52. The torque required is calculated and a predetermined number of stator components 10 are stacked in each stator pole 52 having adjacent back irons 16 bearing against each other to space the coils 12. The housing 380 is formed having a predetermined number of alignment ribs 357 for engaging the predetermined number of stator poles 52.

The stator poles 52 are positioned on an end support 392 in the respective radial position. Connectors 26 are connected together to a motor lead (not shown) or to individual control devices (not shown). The motor lead (not shown) is connected to the connectors 26 and held aside as the stator assembly 50 is axially slid into the housing 380 having the ribs 357 engaging each respective alignment channel 153. A rotor (not shown) is inserted into the rotor opening formed by adjacent tooth tips 17 having a drive shaft (not shown) extending from first axial end 390 to second axial end 392. The motor lead (not shown) is attached to a power source (not shown). A current is applied from the power source to the motor leads and thereby conducted to each coil 12 to create a magnetic field in each stator pole segment 10.

The modular stator is formed by assembling a plurality of stator poles, each stator pole formed by a method of manufacturing a single pole for use in an electric motor stator comprising the following steps, not necessarily in the listed order:

forming a first and second tooth of a soft magnetic composite, each tooth comprising a winding support and a stator face, the stator face on the winding support;

forming a first and second back iron, each back iron comprising an axial face adapted to interface to an adjacent tooth or a motor housing;

forming a first and second coil, each coil having an open core;

inserting the winding support on the first tooth in the open core of the first coil;

inserting the winding support on the second tooth in the open core of the second coil;

attaching the first back iron to the winding support of the first tooth to secure the first coil intermediate the first back iron and the stator face on the first tooth to form a first stator pole component;

attaching the second back iron to the winding support of the second tooth to secure the second coil intermediate the second back iron and the stator face on the second tooth to form a second stator pole component;

assembling a modular stator pole by stacking the first stator pole component on the second stator pole component having the axial face of the first back iron on the axial face on the second back iron;

placing the modular stator pole in a housing to hold the stator pole components in place along the stator pole;

engaging an alignment tool on each stator pole to an alignment rib on the housing to hold the stator pole components in place in the housing;

connecting each coil to an electrical device;

determining if each coil is in field mode or generating mode; and replacing individual coils in the stator pole when the replaced coil fails.

The present invention has been shown and described with reference to the foregoing exemplary embodiments. It is to be understood, however, that other forms, details, and embodiments may be made without departing from the spirit and scope of the invention which is defined in the following claims.

I claim:

1. A method of manufacturing a single pole for use in an electric motor stator comprising:

forming a first and second tooth of a soft magnetic composite, each tooth comprising a winding support and a stator face, the stator face on the winding support;

forming a first and second back iron, each back iron comprising an axial face adapted to interface to an adjacent tooth or a motor housing;

forming a first and second coil, each coil having an open core;

inserting the winding support on the first tooth in the open core of the first coil;

inserting the winding support on the second tooth in the open core of the second coil;

attaching the first back iron to the winding support of the first tooth to secure the first coil intermediate the first back iron and the stator face on the first tooth to form a first stator pole component;

attaching the second back iron to the winding support of the second tooth to secure the second coil intermediate the second back iron and the stator face on the second tooth to form a second stator pole component;

assembling a modular stator pole by stacking the first stator pole component on the second stator pole component having the axial face of the first back iron on the axial face on the second back iron wherein the first coil is held in spaced relation to the second coil.

2. The invention of claim 1 further comprising providing a first connector on the first coil and providing a second connector on the second coil for connecting the first coil and the second coil to an electrical device.

3. The invention of claim 2 further comprising connecting the first connector to the second connector.

4. The invention of claim 1 further comprising stacking a third stator pole component on the second stator pole component whereby the stator pole comprises three stator pole components stacked axially.

5. The invention of claim 1 wherein the back iron is formed of a soft magnetic composite comprising ferro magnetic particles, the ferro magnetic particles individually insulated.

6. A modular stator pole comprising:

a first tooth formed of a soft magnetic composite comprising ferro magnetic particles, the ferro magnetic particles individually insulated, the first tooth comprising a first tooth tip and a first back iron, the first tooth tip comprising a first stator face and a first tooth body, the first stator face having a first concave rotor face and a first outer side, the first tooth body having a first end on the first outer side, a second end spaced from the first end and a first winding support portion intermediate the first end and the second end, the first back iron having an axial end, the first back iron on the second end of the first tooth body;

a first one of the plurality of coils on the first winding support on the first tooth intermediate the first tooth tip and the first back iron;

a second tooth, the second tooth being substantially similar to the first tooth, the second tooth formed of a soft magnetic composite comprising ferro magnetic particles, the ferro magnetic particles individually insulated, the second tooth comprising a second tooth tip and a second back iron, the second tooth tip comprising a second tooth body, a second stator face and an second outer side, the second tooth body having a first end on the second outer side, a second end spaced from the first end and a second winding support portion intermediate the first end and the second end, the second back iron comprising an axial face, the second back iron on the second end of the second tooth body; and a second coil on the second winding support on the second tooth intermediate the second tooth tip and the second back iron, the axial face of the first back iron on the axial face on the second back iron whereby the first coil is spaced axially from the second coil and held in spaced relation by the connected back irons.

7. The modular stator pole of claim 6 further comprising an alignment channel formed on the second end of the first tooth body.

8. The modular stator pole of claim 6 further comprising an alignment channel on the outer surface of the first back iron.

\* \* \* \* \*